United States Patent

Riccitiello et al.

[15] 3,660,199

[45] May 2, 1972

[54] METHOD OF PREVENTING MEASLING WHEN MAKING EPOXY LAMINATES

[72] Inventors: Michael Riccitiello, Amherst; Harry A. Kreitmayer, Tonawanda, both of N.Y.

[73] Assignee: Spaulding Fibre Company, Inc., Tonawanda, N.Y.

[22] Filed: July 24, 1969

[21] Appl. No.: 844,277

[52] U.S. Cl. ............................156/306, 156/311, 156/312, 156/330
[51] Int. Cl. ...........................................................C09j 5/00
[58] Field of Search ..................264/236; 156/312, 330, 311, 156/306, 245

[56] References Cited

UNITED STATES PATENTS 2,586,394  2/1952  Stepien ............................156/312 X
2,683,105  7/1954  Forbes et al. .........................156/312

Primary Examiner—Carl D. Quarforth
Assistant Examiner—Stephen J. Lechert, Jr.
Attorney—Bean & Bean

[57] ABSTRACT

Measling, the appearance of spots or stars under the surface of a resin portion of an epoxy-glass fiber laminate, is prevented or significantly diminished by a laminating process which includes curing plies of glass cloth and epoxy resin at an elevated temperature, e.g., 300° to 400° F., at an elevated pressure, e.g., 750 to 1,500 pounds per square inch, until gel formation occurs by reaction of the epoxy resin and curing agent, after which heating is continued at approximately the same temperature but at a lower pressure, e.g., 50 to 400 lbs./sq. in. Suitably, the initial curing step lasts for about 30 to 80 minutes and the subsequent step takes about 20 to 50 minutes, such times varying with the thickness of the laminate, the nature of the expoxy resin, the temperature employed, the geometry of the laminate, the type of reinforcing cloth, the curing apparatus used and the presence or absence of metal molded into the plastic. After completion of heating, the laminate is cooled in the press and is then removed.

9 Claims, 4 Drawing Figures

PATENTED MAY 2 1972

3,660,199

INVENTORS
MICHAEL RICCITIELLO
HARRY A. KREITMAYER

BY

Bean & Bean
ATTORNEYS

METHOD OF PREVENTING MEASLING WHEN MAKING EPOXY LAMINATES

When laminates made according to the method of this invention are heated after manufacture, as in applying lead to metal thereon or in soldering electronic circuit parts or contacts onto the metal in the manufacturing of printed circuits, measling, found in laminates of epoxy resins and glass fibers made by conventional processes and subsequently heated, is not observed. Thus, the laminates of this invention are of more attractive appearance and avoid a defect previously found in similar products.

Laminated articles, such as printed circuit boards and various structural parts of machines, appliances and vehicles, are presently being manufactured commercially by laminating together woven glass fiber sheets, by means of epoxy resins. Epoxy resins, being good insulators, chemically inert, low in moisture absorption, structurally strong, dimensionally stable and not shrinking or expanding appreciably on molding, are especially suitable materials of construction for printed circuit boards. Also, the epoxy resin effectively separates the glass reinforcing fiber strands so as to prevent them from contacting each other, whereby fiber abrasion and consequent weakening of the manufactured laminate are prevented.

Although other reinforcing means, such as paper or cotton cloth sheets or webs may be employed in laminates, among the best materials are woven sheets or webs of glass fibers. The fibers used may be pre-treated with chemicals to prevent absorption of water on the surfaces thereof. Water absorption is objectionable because the presence of water on the glass fibers can interfere with the curing of the resin and can cause development of irregularities or bubbles in the laminate.

Despite care taken in the selection of the epoxy resin and the glass fiber sheets of the laminate and although these are maintained and employed in essentially moisture-free condition, it has still been found that the laminates produced, when heated after manufacture, develop a defect in appearance known as "measles." The present invention is directed to preventing such measling of the laminate.

Measling is a condition evidenced by discrete spots or crosses appearing below the surface of the laminate. Apparently, the spots or crosses, which are light colored or white, indicate separations of glass fibers or strands in a glass cloth sheet, at some points of intersection of the fibers or strands of the woven cloth. Such imperfections, while they may not be noticeable immediately after molding of the laminate, become apparent after heating, either during normal use of the article made or after a subsequent treatment or operation in which heat is applied. Although structural strength and other useful properties of the laminate might not be adversely affected by measling, the measled appearance of the laminate is unattractive and may be good cause for rejection for many end uses. Because of this, various changes in manufacturing techniques and formulae have been tried in an effort to prevent measling. However, until the present invention, none was found to be effective.

Although the cause of measling has not been definitely established, a theory that has been advanced is that it results from stresses created within the laminate during curing and cooling. Accordingly, various operations have been suggested which rely upon slow cooling at atmospheric pressure, either inside or outside the laminating mold or press. It has been proposed that cooling be effected while maintaining the laminating pressure. Also, subsequent heating of the molded article, after cooling and removal from the mold, has been suggested, this being in the nature of an annealing process. Such methods have been effective in preventing or relieving stresses or strains in other materials, including other plastics, but they do not prevent or significantly diminish measling in epoxy resin-glass fiber sheet laminates, herein described. So far as is known, only the method of this invention accomplishes this result.

In accordance with the present invention, there is provided a method for the prevention of measling of epoxy resin-glass fiber laminates by pressing and curing a plurality of plies or laminae of epoxy resin-glass fiber sheets at an elevated temperature and pressure in the presence of a curing agent, to produce a gel, completing the cure of the epoxy resin at an elevated temperature and a lower pressure, and then cooling the laminate. After cooling, which is preferably effected quickly, the laminate may be removed from the mold and processed further, if desired. Laminates containing metal surface portions, which may be joined thereto during the molding operation or afterward, are sometimes heated after molding, in conjunction with lead or solder coating of the surface metal or during the affixation of contacts or electronic parts and circuitry to the metal, usually after etching away the unneeded portions of metal. Such heating of laminates made according to the processes of this invention may be to temperatures as high as 500° to 600° F. for periods up to about 10 minutes, without causing measling.

So as to indicate more fully the operations and advantages of the present invention, reference is made to the following description, taken in conjunction with the accompanying drawing in which, by way of illustration, there is shown schematically a preferred embodiment of the apparatus for effecting the process of the invention, together with a preferred product made, compared to a prior art product after subsequent heatings. Of course, other embodiments of the invention employing the same or equivalent elements and principles may also be employed, in accordance with the inventive concept.

THE DRAWING

Figure 1:
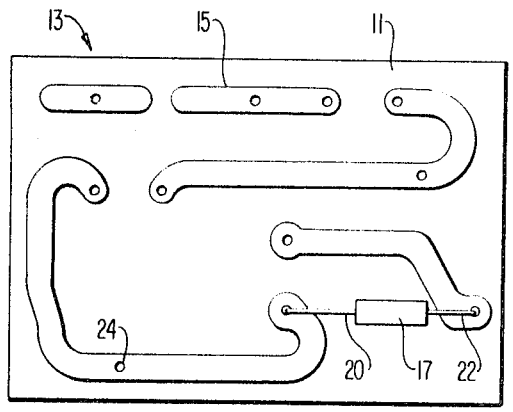
FIG. 1 is a top plan view of an epoxy-glass laminate of this invention after etching away of unneeded copper cover sheet thereon and after heating to 525° F. for 5 minutes, at which time solder was applied and an electronic part was fastened to the soldered copper.

In FIG. 1, upper surface 11 of laminated printed circuit board 13 has attached thereto solder-coated copper strips 15, onto two of which is joined, by wires 20 and 22, an electronic part 17, such as a transistor. Also illustrated are holes 24 ready for insertion of wire connectors and soldering of other parts. Copper strips 15 result from etching away with acid, by usual printed circuit manufacturing methods, of the undesired portions of copper, originally laminated together with epoxy-glass fiber laminate. The copper strips are coated with solder by dipping into a solder bath before soldering thereon of the circuit element 17. The laminate illustrated, made by a high pressure process with post-gelation treatment by the method of this invention, exhibits no measles, although it was heated to a temperature of 525° F. for 5 minutes, during deposition of the lead solder and soldering of electronic part 17.

Figure 2:
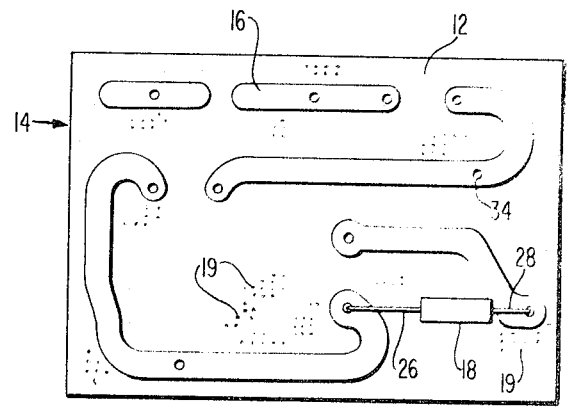
FIG. 2 is a top plan view of a similar epoxy-glass laminate made by a prior art process and subsequently heated to 525° F. for 5 minutes.

In FIG. 2 is shown a similar laminate, made from the same materials but by a conventional process. Upper surface 12 of laminated board 14 has upper strips 16, electronic part 18, wires 26 and 28 and holes 34. The entire cure was effected at a high temperature and, unlike the process applied to the manufacture of the product of FIG. 1, after gelation or initial curing there was continued heating at unreduced pressure to final curing, followed by cooling and discharge of the product from the mode. It will be noted that the laminate of FIG. 2 exhibits measles 19, which are light stars or spots that appear to be under the surface of the laminate, and are frequently located near the soldered parts. These measles make the laminate unattractive for many products and cause its rejection by purchasers who do not wish to use it because of the presence of the measles, either because of the poor appearance, or because they suspect that the appearance is a sign of a structural defect or inadequacy.

Figure 3:
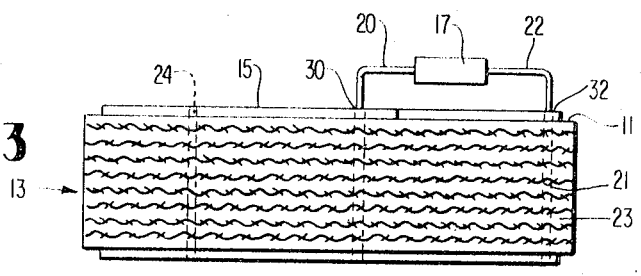
FIG. 3 is a side elevation of the laminate shown in FIG. 1, with the height exaggerated for clarity of exposition.

FIG. 3 shows a side elevation of the laminate of FIG. 1. In this view the height of the laminate is exaggerated so as to show the eight separate 8 mil glass sheet layers therein, covered with and bound together by the epoxy resin. Because of their great strength, the glass fiber sheets strongly reinforce the laminate. Glass sheets 21 are evenly distributed throughout the resin formulation 23 in the illustrated preferred form of the laminate. Holes 24, drilled through the laminate, are ready for the receipt of wires and solder to fasten other electronic circuit parts to the printed circuit, as was done at 30 and 32.

Figure 4:
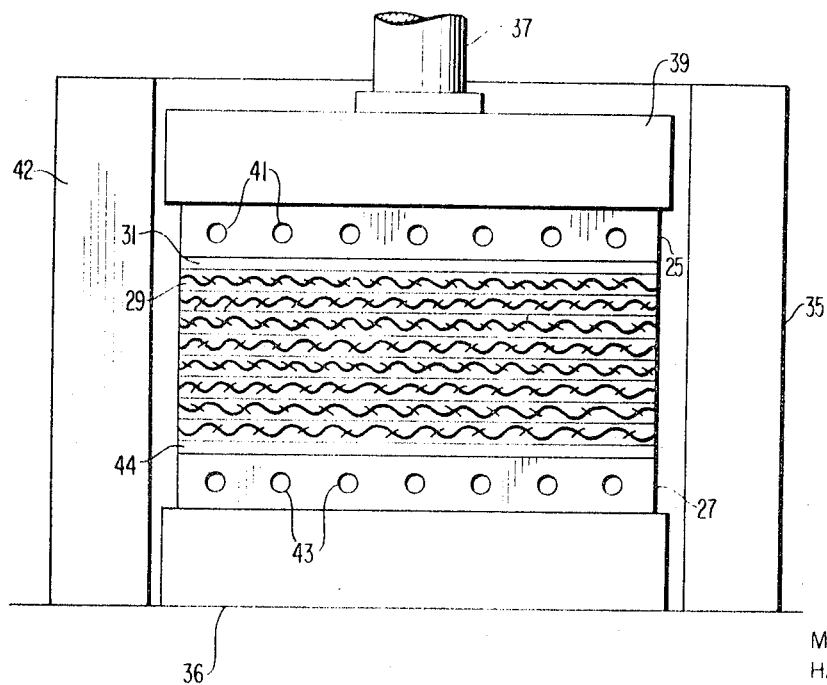
FIG. 4 is a central vertical sectional view of part of a laminating press, in closed position, showing the pressing of a laminate like those which were employed to make the products shown in FIGS. 1, 2 and 3.

FIG. 4 illustrates schematically in partially cut-away side elevation, a molding press employed to manufacture the laminates shown in the other figures. Such a press is capable of having platens 25 and 27 exert a pressure of as much as several thousand pounds per square inch on the parts of the laminate placed between guides 35 and 42. As is seen in FIG. 4, eight laminae 29 and two copper face covers 31 and 44 of foil are placed between stainless steel platens 25 and 27 and the platens are forced together by force-transmitting member 37, which is usually hydraulically powered. Such force is transmitted to ram head 39 which presses down on platen 25. Movement of platen 27 is prevented by stationary support 36. The laminae are held under the high pressure transmitted for a period of time long enough for the epoxy resin to form a continuous gel about the glass fiber sheets. The platens are heated by passage through internal passageways or bores therein, designated 41 and 43, of an appropriate heat transfer medium, a fluid such as steam, water or diphenyl. By circulation of the fluid through the platens the temperature is held constant at the desired level during the curing cycle. After the epoxy resin gel is produced, as desired, the pressure is lowered while the temperature remains the same, according to the process of the present invention. After completion of heating, a cooling fluid is circulated through the platens and the laminate is cooled to an internal temperature which is usually 125° F. or lower. The upper platen is then withdrawn and the laminate is removed from the press. It is cut to present invention. After completion of heating, a cooling fluid is circulated through the platens and the laminate is cooled to an internal temperature which is usually 125° F. or lower. The upper platen is then withdrawn and the laminate is removed from the press. It is cut to desired size and is ready for further treatments, such as etching to form the conductive path of a printed circuit on the metal cover, and drilling, after which the copper remaining may be coated with lead or solder by dipping it into the heated coating metal, and it may have electronic parts or contact points fastened to it.

As illustrated for simplicity only a single laminate is shown in FIG. 4, with a pair of platens. Of course, in preferred commercial operations several laminates may be pressed at a time, with platens separating them. For example, laminates and platens may be alternated to the full height of a 4 foot press, and sheets 4 feet by 3 feet, or larger, may be made.

The epoxy resins that are employed in the practice of the present invention may be those which are known in the art, although it is preferred to use DGEBA (diglycidyl ethers of Bisphenol A). Detailed descriptions of suitable epoxy resins, modifiers, curing agents, accelerators, fillers, glass cloths, manufacturing conditions, etc., may be found in the Encyclopedia of Polymer Science and Technology, Vol. 6, pp. 209–271 (Interscience Publishers, New York, 1967) and in the Handbook of Epoxy Resins, by Henry Lee and Kris Neville (McGraw-Hill, New York, 1967).

The preferred epoxy resins, of the DGEBA type, are made by the reaction of Bisphenol A with excess epichlorohydrin in an inert atmosphere under alkaline conditions to neutralize the hydrogen chloride resulting from the condensation. Instead of using alkali, Friedel-Crafts catalysts may be employed, such as zinc chloride or boron trifluoride, followed by dehydrohalogenation with a compound such as an aluminate, silicate or zincate in a substantially non-aqueous medium. The epoxide equivalents of such compounds are generally in the range of 150 to 1,000 and usually are about 200 to 600. The average molecular weights are from 340 to about 1,500, preferably 340 to 1,200.

Instead of DGEBA other epoxies, such as the glycidyl ethers of glycerol, glycidyl ethers of Bisphenol F, polyglycol glycidyl ethers, glycidyl ethers of tetrakis (hydroxyphenyl) ethane, phenyl glycidyl ethers and epoxylated novolacs may be used. Furthermore, various mixtures of epoxy resins may be employed, either as physical mixtures of different types of epoxies or as chemical combinations, having different resin-forming portions reacted into one epoxy molecule. Additionally, the epoxy resins may be utilized with other types of resins so as to obtain desired modifications of physical and chemical properties.

The epoxy resins employed can be made fire retardant, either by addition of a fire retardant chemical to the compositions or by chemical modification of the resin or a component thereof to include fire retardant elements, such as chorine, bromine or phosphorus. Thus, resins based on chlorendic anhydride, brominated Bisphenol A or halogenated novolacs are especially useful when used in applications or under conditions which might lead to subjection of the product to conditions which would cause combustion of ordinary epoxies.

The above mentioned epoxy resins are commercially available from several manufacturers. Among the brand-named products employed extensively are Bakelite-ERL (Union Carbide), Araldite (CIBA), DER (Dow), Epi-Rez (Jones-Dabney) and Epon (Shell). The trade names of such products are further modified by various numerical designations which identify the many different epoxies commercially available.

Conventional curing agents may be used to cure or permanently set the epoxy resins in the laminates. These include the primary and secondary amines and various adducts and derivatives thereof, which act as cross-linking agents. Amides and organic acids and acid anhydrides are also useful. It is preferred to utilize curing agents which lend themselves to the making of B-stage resins, so as to facilitate laminate manufacture by the dry lay-up technique. Such include dicyandiamide and 4, 4'-methylene dianiline. However wet lay-up methods are also workable under proper control and curing agents that do not B-stage can be used in such methods. Other curing agents include diethylene triamine, diethylamino propylamine, piperidine, ethylene diamine, triethylene tetramine, dimethylamino propylamine, menthane diamine, metaphenylene diamine, 2, 6-diamino pyridine, 4-chloroortho-phenylene diamine and diaminodiphenyl sulfone. Of course, various suitable mixtures of curing agents are also usable.

Catalysts or accelerators for the curing reaction may also be used with the curing agents, as may be latent curing agents, to adjust the time of cure. Solvents facilitate the thinning of the resin and promote ready application of the resin to the glass sheet. Among the solvents that are used are dimethyl formamide, ethylene glycol monoethyl ether, ethylene glycol monomethyl ether, xylene, butyl glycidyl ether and phenyl glycidyl ether. Some of these might also function as diluents, even primarily, but they also exert solvent actions. If desired, fillers, resinous modifiers and flexibility improving additives may be employed in the epoxy to improve the properties of the finished laminates or to decrease costs. Among these are asbestos, silica, calcium carbonate, polyesters, vinyl resins, phenolic resins, polyurethanes, flurocarbons, polyamide resins and polysulfides.

Although various types of glass cloth may be employed in making the present laminates, it is preferred to utilize a woven cloth of the plain weave type, in which the warp and filling threads cross alternately. Also, rovings may be used but it is preferred to employ yarns composed of strands of filaments. The strands usually comprise about 100 to 300 filaments or fibers, preferably about 200, of diameters within the 0.1 to 0.6 mil range, preferably 0.1 to 0.3 mil. An average filament within such range is acceptable and the size range of filaments or fibers in a particular strand is preferably small. It is preferred that the fiber be a uniform 0.15 mil in diameter. Although a plain weave is preferable, other weaves, such as basket, crowfoot, satin or leno weaves or other weaves in which the strands cross each other may be used. The fibers of the weaves are usually of borosilicate or other glass which is acceptable for the intended purpose. The most useful fibers have been chrome or silane finished and high chrome finished filaments are best. However, heat cleaning of the fibers may be practiced in conjunction with such finishing, to remove traces of water. If chrome finishing is practiced, a chemical useful to make the finish on the glass surface is methacrylato chromic chloride. High chrome finishing is preferred so that the chrome content of the glass is from 0.05 to 0.08 percent. The fibers that are treated and which are stranded and woven into sheet form preferably meet the requirements of Standard D-2410 of the American Society for Testing Materials. Acceptable commercial designations for useful products include ASTM commercial grades 128-75DE, 128-75G, 128-75K, 112-150, 112 and 116-150. Preferably, 128-75 DE material is used.

It is known in the epoxy resin laminate art how to adjust the proportions of resins, curing agents, accelerators, reinforcing glass sheets, and other materials to make an acceptable epoxy laminate. Such is described in the Lee-Neville Handbook of Epoxy Resins, previously mentioned. Briefly, the number of gram moles of epoxy groups in the resin is calculated and the equivalent number of gram moles of active hydrogen in the curing agent should be employed. Of course, some variation from exact stoichiometric proportions is acceptable but the variation should be small in usual cases, not often exceeding a 20 percent deviation from that calculated, with allowance being made for side reactions that take place due to impurities or other materials being present. The amounts of catalysts or accelerators employed depend on the desired speed of reaction, usually being from 5 to 15 parts per hundred of resin, by weight. The usual epoxy resin-glass fiber laminate will contain from 25 to 60 percent resin, usually from 30 to 50 percent, and the remaining larger proportion of the product will be glass fibers. Resinous modifiers, flexibility modifiers, fillers and other ingredients, if present, should be in minor proportions relative to the resin. Those of skill in the art, from this description, will know the proportions of the various constituents that are to be employed to make satisfactory products.

The laminates of the invention are usually pressed by high pressure methods. This means that the pressure is generally in excess of 1,000 pounds per square inch, although pressures as low as 500-700 lbs./sq. in. may be used. The upper limit of molding pressure is usually set by the limitations of the molding or pressing equipment. Generally, the upper limit will be at about 2,000 lbs./sq. in. and it is rare that the pressure will exceed 1,500 lbs./sq. in. Initial molding pressures are preferably from 900 to 1,100 lbs./sq. in.

The molding temperature will normally be from about 300° to 400° F., preferably 320° to 370° F. and most preferably, 330° to 360° F. The temperature is maintained in this range for a suitable time to allow gelation of the resin in all the laminae charged to the mold and may be maintained longer. It will normally take from 30 to 80 minutes to cause the development of the gel and ending of the initial cure period. Then, at a lower pressure, from 50 to 400 lbs./sq. in., the temperature is maintained for a subsequent curing or post-curing period of 15 to 50 minutes, after which the temperature of the laminate is quickly lowered to 150° F. or preferably, 125° F. (the temperature of the middle lamina) or less, by forced passage of coolant, such as cooling water, through the platens of the mold. The platens' passageways allow flow therethrough of either heating or cooling media, to controllably promote heating during the curing period or speedy cooling after the cure has been completed.

As is known in the art, the time of cure will depend on the thickness of the laminae and the number thereof, which affect heat transfer. It is important that the central portion of the middle lamina be at a curing temperature and that it be cooled to a temperature at which it will be form-retaining, when removed from the press. Thus, for a laminate that is one-sixteenth inch or less thick, comprising eight or fewer laminae, each of which is about 8 mils or less thick, after pressing, preferably the full pressure may be applied for about 55 to 60 minutes at 330° F. to 360° F., after which diminished pressure may be applied for about 15 to 20 minutes, while maintaining temperature. If such a laminate is to be three-thirty-secondths inch in thickness, preferably, the curing at full pressure will take 75 to 80 minutes and the subsequent heating will last 20 to 25 minutes. The laminates will usually be between one-sixty-fourth inch and three-thirty-secondths inch, according to the present invention.

The laminae, including glass fiber sheet and surrounding epoxy resin, are usually from 3 to 20 mils thick and preferably, are from 5 to 10 mils. Copper or other conductive metal surface plates or foils are usually from 1 to 10 mils in thickness preferably 1.4 to 2.8 mils. It has been found that the pressure for the initial heating period of the cure should not be lower than 500 lbs./sq.in. with the present compositions because otherwise the resin is not satisfactorily distributed throughout the laminate and imperfections appear. In the lower pressure heating and curing stage, if both sides of the laminate are covered with metal, such as a thin copper sheet, the pressure should be maintained at or above about 50 lbs./sq. in. to prevent blistering of the copper or metal. On the other hand, if one or two faces of the laminate are uncovered, at pressures below about 400 lbs./sq. in. mottling and pitting effect may be noted after uses of some presses, apparently due to surface waves and irregularities which can be caused by "rough" platen faces or untrue rams. Thus, it is desirable to lower the pressure for the second portion of the heating cycle as much as feasible but in some circumstances the diminution is limited by physical difficulties encountered.

The laminae that are charged to the press are composed of epoxy resin composition coated onto glass fiber sheets. Such coating may be effected by either a wet or dry method but the dry method is much preferred. Following this procedure, the liquid resin, either naturally liquid or thinned by heating or solvent addition, is coated onto the glass fabric by passing the fabric through the liquid resin so as to deposit resin composition on the glass and make a product that is from about 25 or 30 to 60 percent, preferably 35 to 45 percent and most preferably from 38 to 43 percent resin. The resin composition, containing curing agent and other modifiers and fillers, is next preferably partially cured to the B-stage so as to produce a dry lay-up. The B-staging is accomplished by passing the sheet of glass fiber, coated with resin, into an appropriately heated zone wherein sufficient heat is applied, either directly or stepwise, to convert the resin to the B-stage, at which it is dry but still contains uncrosslinked resin. In heating to the B-stage, volatiles are driven off and the volatiles content of the resin is reduced to a very minor proportion, usually less than 1 percent. The extent of B-staging is such that the resulting product is desirably of a resin flow of 10 to 20 percent, preferably 12 to 16 percent and most preferably, for the resins employed in the examples of this specification, 14 percent. After B-staging the sheet may be cut to size for pressing or this may be done after final curing.

The lay-ups of epoxy-glass fiber are then placed in the press, either with or without surface layers of metal thereon. Since B-staged resins might further polymerize, the pressing or molding should be effected soon after B-staging, or if the materials have to be stored, this should be at low temperature and low humidity, to retard polymerization. The number of laminae to be pressed together may vary and can be as low as one, if the sole purpose of the operation is to affix a metal cover or covers to the epoxy substrate. However, for usual thicknesses, normally from three to 20 laminations are employed, preferably four to 10 and most preferably seven to nine, depending on the desired laminate thickness. Additionally, the metal surfaces may be applied to one or both faces. After placement of the lay-ups and metal covers, if used, the heated press is closed and desired high pressure is maintained for the requisite period of time to produce a continuous gel throughout the laminate. In this pressing, the remaining small proportion of volatile material is driven off and the resin fully permeates and contacts the glass fibers and strands. Following the initial curing period, the pressure is lowered, by decreasing the force exerted by the pressure transmitting members until the desired lower pressure is reached, after which this is held for a sufficient time either to complete the cure or to post-cure the laminate, under pressure. After completion of the second pressure cure stage, preferably while maintaining pressure, the heating fluid in the platens is withdrawn and is replaced by coolant, to lower the temperature of the laminate so that its interior is sufficiently cooled to allow easy withdrawal of a stable laminate. Usually, such cooling should be to a temperature no higher than about 150° F. and it is preferred to lower the temperature to 125° F. or lower, usually in 5 to 30 minutes, preferably as quickly as possible, which will often be in 10 to 20 minutes for laminates which are one-sixteenth inch to three-thirty-secondths inch thick. After removal from the press the laminate may be cut to shape and size, machined, etched, drilled, heated or subjected to other treatment to convert it to final form, as a printed circuit board.

The following examples illustrate the processes and products of this invention. It should be borne in mind that the process described herein is a general one and is not to be considered as limited by the examples thereof given. The most general form of the invention is not restricted to particular conditions which apply to the laminates specifically described herein, since it should be recognized that by changing constituents, thicknesses of laminae and laminates and by modifications of process conditions, e.g., temperature, pressure and time, other conditions might preferably also be varied to make the best products. All temperatures are in degrees Fahrenheit and all parts are by weight, unless otherwise stated.

EXAMPLE 1

|  | Parts |
| --- | --- |
| Resin (DGEBA of molecular weight about 500) | 56.0 |
| Curing Agent (Dicyandiamide) | 2.5 |
| Solvent (Dimethyl formamide) | 17.4 |
| Solvent (Acetone) | 24.0 |
| Accelerator (Benzyl dimethylamine) | 0.1 |

To the resin, dissolved in solvent acetone, are added curing agent and accelerator, in the rest of the solvent, after which the fluid resin is coated onto a high chrome, plain weave glass fiber cloth which meets ASTM specification D-2410, by passing the sheets of glass through the resin mixture. The buildup of resin on the glass is to the extent of 40 percent of the total weight of the coated glass. The glass fabric coated with wet resin is then heated in an oven, where the temperatures are progressively increased, in three stages, from 200° F. to 350° F., to B-stage the resin to a resin flow of 14 percent and to drive off solvents and other volatiles. The product resulting is suitable for use as a dry lay-up in pressure laminating of the resin-glass fiber sheets. It is cut into sheets of desired size for pressure molding, the sheets being about 8 mils thick and 3 feet by 4 feet and then the sheets are assembled with other such sheets and copper covers to make a lay-up of eight sheets and two copper foil face covers, each of the faces being about 1.5 mils thick.

The 10-layer assembly is then placed in an appropriate high-pressure press of the type illustrated in FIG. 4 and is subjected to a temperature of 340° F. at a pressure of 950 lbs./sq. in. for 60 minutes, which causes the development of a resin gel throughout the laminate made. Next, while diminishing the pressure of 950 lbs./sq. in., to 50 lbs./sq. in., the curing temperature is maintained at 340° F. for an additional 20 minutes, after which, while still in the press and under the reduced pressure, cooling water at 70° F. is passed through the mold platens and the temperature of the laminate is lowered within 20 minutes to about 125° F., and the laminate is discharged from the mold. The finished laminate is about one-sixteenth inch thick and the copper surface sheets exhibit no pitting, waviness or blistering. The excess copper is etched away by standard techniques for the manufacture of printed circuits, leaving copper conductive paths on each major surface of the laminate, as illustrated in FIG. 1. The entire laminate is dipped into a lead solder bath maintained at 525° F. to coat the copper with solder and in another operation soldered electronic parts are applied to the copper conductor by drilling holes at the desired points, inserting the leads from the parts and dipping the laminate into heated solder at 525° F. The initial solder coating is about 0.3 to 0.6 mil thick and the solder buildup for the latter operation is from 1 to 10 mils. Neither heating step causes measling of the laminate surface, but in other comparable experiments or processes, in which the entire cure of the resin is at the pressure of 950 lbs./sq. in., the other conditions being the same, upon the subsequent heating mentioned measling of the laminate occurs, reducing its attractiveness.

When, in place of the DGEBA-dicyandiamide system there are employed other epoxy resin-curing agent systems, such as glycidyl ethers of Bisphenol F-dicyandiamide, glycidyl ethers of Bisphenol F-4, 4'-methylene dianiline, epoxylated novolac-dicyandiamide, epoxylated novolac-4, 4'-methylene dianiline, and phenyl glycidyl ether-dimethylamino-propylamine, with adjustment of the proportions of resin and curing agent to approximately stoichiometric amounts, the products resulting are resistant to measling, when made by the invented process described, as compared to laminations produced entirely at the mentioned high pressure.

EXAMPLE 2

The procedure of Example 1 is followed, using a DGEBA resin of molecular weight about 1,000 and about 5 phr of 4, 4' methylene dianiline, as curing agent. In other experiments the molecular weight of the epoxy resins used is 375 and 1,500, with proportions of curing agent being adjusted accordingly. The resin-glass ratio in the product is 35 percent and the resin flow is 12 percent. The pressing is for 50 minutes at 1,200 lbs./sq. in. and is followed by 40 minutes at 100 lbs./sq. in., both pressing periods being at a temperature of 380° F. Cooling is effected to an internal temperature of the innermost lamina of 125° F., in 20 minutes, and the laminate is discharged from the mold. The 1/16-inch laminate produced, with copper faces, does not exhibit measles on face portions from which the copper has been removed, upon heating, as in soldering. A corresponding product, made without lowering the pressure in the subsequent heating stage, will develop measles when heated during soldering of metal thereon.

EXAMPLE 3

A plain weave fiber glass sheet treated with methacrylato chromic chloride to a high chrome content (0.06 percent) on the surface thereof is impregnated with a resin composition of the following formula:

|  | Parts |
| --- | --- |
| DGEBA resin (Araldite 465 AK 70, resin of molecular weight of 400–600, and including 30% acetone, as solvent) | 79.20 |
| Dicyandiamide | 2.26 |
| Dimethyl Formamide | 10.00 |
| Methyl Cellosolve | 8.40 |
| Benzyl Dimethylamine | 0.14 |

The resin composition on the glass fibers is present in such quantity to produce a final product of 40.5 percent resin. The coated glass sheets are passed through an oven, having three heating zones, wherein the resin is converted to a "prepreg" or stage B resin, having a resin flow of 14 percent and a volatile content of less than 1 percent. The B-stage prepreg is severed into sheets, which are stacked eight layers high, of about 8 mils each, with facing copper foils, of about 1.5 mils thickness on the ends, and the assembly is placed between the stainless steel platens of a press, which are steam heated. By hydraulic means a molding pressure of 1,000 lbs./sq. in. is applied at a temperature of about 335° F. for 55 minutes and gelation of the resin occurs, after which additional heating at the same temperature is effected at a pressure of 50 lbs./sq. in. for 20 minutes. Then, the laminate is cooled quickly by passing cooling water through the platens, so that the middle lamina is at a temperature of 125° F. after 30 minutes of cooling. The platens are then withdrawn and the laminate is removed from the press. The run is repeated without the copper plates on either face and the only change in procedure is for the second heating period to be at a pressure of 400 lbs./sq. in. To make 3/32-inch laminates heating cycle times are changed to total about 100 minutes, usually 75 minutes at the higher pressure and 25 minutes at the lower pressure, and the plies are increased to 12 or are approximately thickened.

When the products made by the method of this example are heated to 525° F. for 5 minutes, measling does not occur. Also, the laminates are not wavy or pitted and if they contain copper surfaces, these are not blistered. To the contrary, when similar procedures are followed but the entire heating is performed at the higher pressure, products result that measle objectionably.

EXAMPLE 4

| | Parts |
|---|---|
| Araldite 465 AK 70 resin (described in Example 3) | 52.60 |
| Brominated DGEBA resin (Araldite 8011EK 80, of molecular weight of about 500) | 24.90 |
| Dicyandiamide | 2.27 |
| Dimethyl Formamide | 10.30 |
| Methyl Cellosolve | 8.65 |
| Benzl Dimethylamine | 0.14 |
| Antimony trioxide | 1.14 |

The procedures described in Example 3 are followed, producing thin and thick laminates, with or without metal faces. The laminates are made by the method of the present invention and by a comparative method, wherein the entire cure is effected at high pressure. Measles are not produced when the laminate is heated to a temperature of 525° F. for as long as 5 minutes but they are produced when the comparative method is followed. The products made according to this example are especially useful because of their resistance to combustion, due to addition thereto of fire retardant resin and fire retardant additive.

What is claimed is:

1. A method for preventing measling upon heating of an epoxy resin-glass fiber laminate which comprises pressing a plurality of laminae of epoxy resin-glass fiber sheets at a temperature of about 300° to 400° F. and a pressure of over about 500 lbs./sq. in., in the presence of a curing agent to produce a gel of partially cured resin, lowering the pressure to about 50 to 400 lbs./sq.in., while maintaining the temperature in the range of 300° to 400° F., and continuing heating until the resin is completely cured, cooling the laminate produced, reducing the pressure on the laminate, and removing the finished, cooled and completely cured laminate from the press.

2. A method according to claim 1 wherein the curing is of a plurality of epoxy resin-glass fiber laminae at a pressure over 700 lbs./sq. in. and is conducted over a period of about 30 to 80 minutes and the subsequent heating at a pressure of about 50 to 400 lbs./sq. in. is conducted for about 20 to 50 minutes.

3. A method according to claim 2 wherein the laminate contains at least three laminae and the cooling effected takes place within about 5 to 30 minutes and lowers the temperature of a middle lamina of the laminate to less than 150° F.

4. A method according to claim 3 wherein the epoxy resin is a diglycidyl ether of Bisphenol A, the curing agent is dicyandiamide and the glass sheet is a plain weave of chrome treated fibers.

5. A method according to claim 4 wherein the laminae charged to the press for molding comprise 38 to 43 percent epoxy resin and 57 to 62 percent glass fabric, the curing is at about 1,000 lbs./sq. in., the temperature to which heating is effected is from 330° to 360° F., and the cooling is to a temperature of 125° F. or less.

6. A method according to claim 5 wherein the laminae charged to the press are charged as dry lay-ups of B-stage epoxy resin having a resin flow of about 12 to 16 percent and a volatiles content less than 1 percent.

7. A method according to claim 6 wherein the number of laminae charged to the press is from three to 20 and the thickness of the finished laminate is from about one-sixty-fourth inch to three-thirty-secondths inch.

8. A method according to claim 7 wherein at least one major face of the laminate has molded thereinto a surface metal, which was charged to the press together with the dry lay-ups and was pressed into the curing resin.

9. In a method for manufacturing epoxy resin-glass fiber laminates at a temperature of about 300° to 400° F. in a press, the improvement which results in production of a laminate which is non-measling on heating, which comprises pressing a plurality of laminae of epoxy resin-glass fiber sheets at a pressure over 700 lbs./sq. in. to produce a gel of partially cured resin and then lowering the pressure to 50 to 400 lbs./sq. in. until the resin is completely cured, after which the laminate is cooled, the pressure is reduced to atmospheric and the laminate is removed from the press.

* * * * *